Nov. 14, 1933.  C. BUTZ  1,935,015
HAM PRESS
Filed July 11, 1931
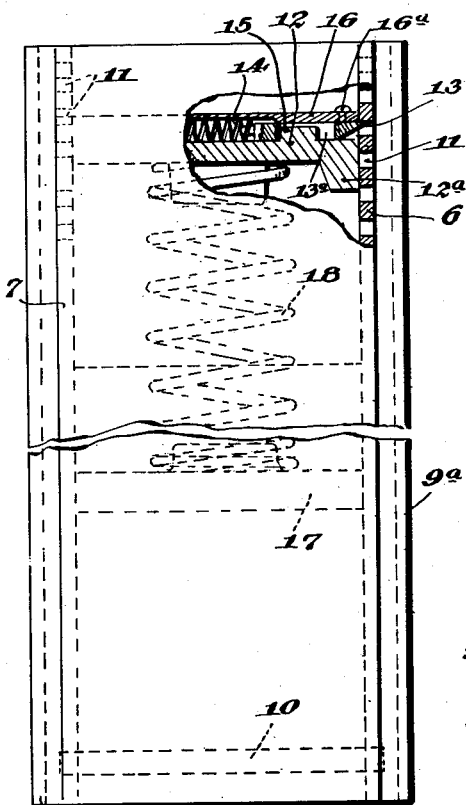
Fig. 1.
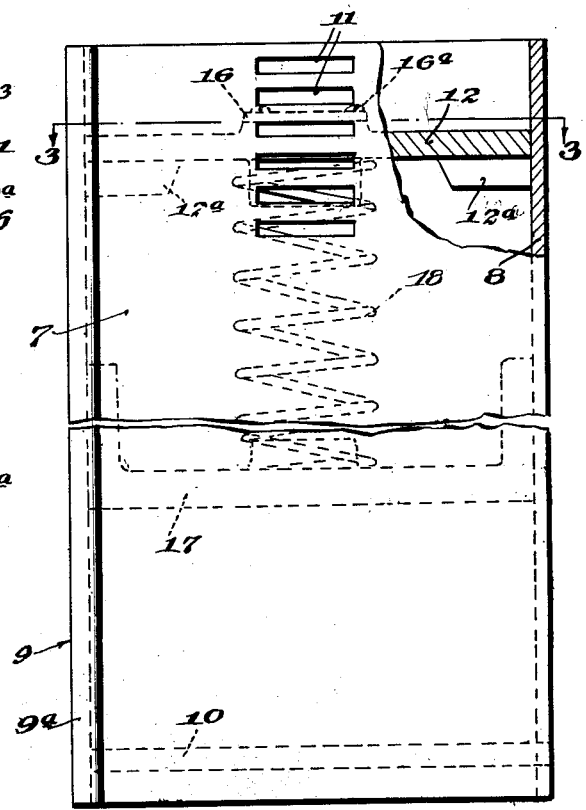
Fig. 2.
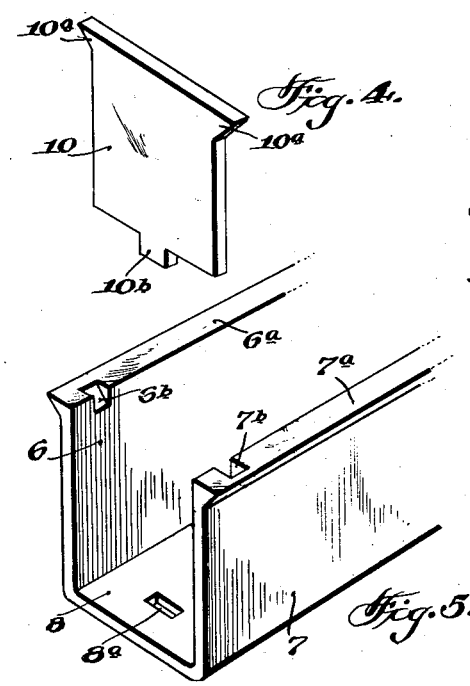
Fig. 4.
Fig. 5.
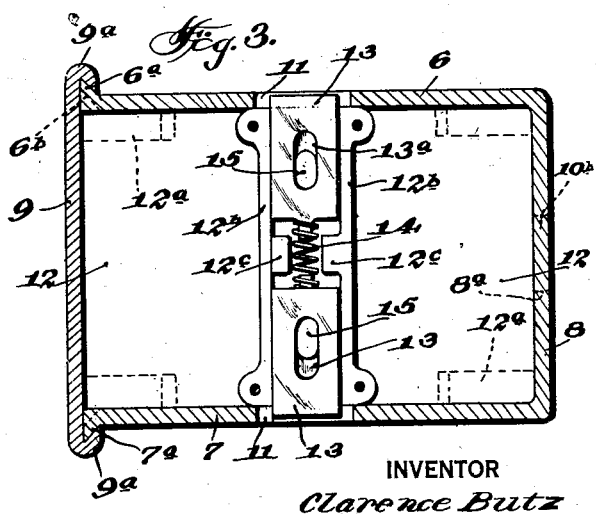
Fig. 3.
INVENTOR
Clarence Butz
BY
ATTORNEY Patented Nov. 14, 1933

1,935,015

UNITED STATES PATENT OFFICE 1,935,015

HAM PRESS

Clarence Butz, Muscatine, Iowa

Application July 11, 1931. Serial No. 550,195

2 Claims. (Cl. 100—57)

My invention relates to improvements in ham presses of the type set forth in my prior Patent No. 1,792,411, Feb. 10, 1931, and it consists in the combinations, constructions and arrangements herein described and claimed.

In said prior patent I disclosed a container having a presser head acted upon by a spring, the opposite end of the spring being connected with a pressure plate. In said prior application the device had a series of springs disposed on the outside connected with teeth on the inside of the container, which teeth were engaged by the pressure plate and were forced aside against the spring tension but which prevented a retractive movement as the teeth were cleared successively.

An object of my invention is to provide a ham press having a smooth surface on the outside as well as on the inside, thus facilitating the washing of the container.

A further object is to eliminate parts, such as the springs and teeth of the prior patent, thus rendering the device simpler in construction and cheaper to build.

A further object is to provide a ham press in which the pressure plate is positively held against retraction, but in which there are no projections on the interior or exterior to cut into the hands from the sharp edges.

A further object of the invention is to provide improved means for assembling the end and cover plates and for removing these parts to facilitate the removal of the cooked ham.

Other objects and advantages will appear in the following specification and the novel features of the invention will be particularly pointed out in the appended claims.

My invention is illustrated in the accompanying drawing forming a part of this application, in which:

Figure 1 is a side view of the device, a portion being broken away and shown in section;

Figure 2 is a view at right angles to Figure 1, a portion being broken away and shown in section;

Figure 3 is a section on the line 3—3 of Figure 2;

Figure 4 is a perspective view of an end plate; and

Figure 5 is a perspective view of an end of the container to which the end plate shown in Figure 4 is applied.

In carrying out my invention, I provide a container consisting of side walls 6 and 7 respectively, a rear wall 8, a cover portion 9 and an end plate 10. That end of the container opposite the end plate 10 is open. The container is preferably made of metal, and in the present embodiment, as shown in Figure 3, it is of rectangular cross section. The walls 6 and 7, as will be seen from Figures 3 and 5, have V-shaped flange portions such as those shown at 6a and 7a respectively. The walls are provided with recesses 6b and 7b respectively arranged to receive the V-shaped extensions 10a of the plate 10. This latter plate has a tongue 10b, which is arranged to enter an opening 8a in the wall 8. The cover 9 has flanges 9a having recesses arranged to receive the V-shaped flanges 6a and 7a. As will be seen from Figures 1 and 2, the sides 6 and 7 are provided with slots 11 near the upper edge of the container.

A pressure plate 12 is provided, having thickened end portions 12a that are arranged to bear on the interior walls of the container. As will be seen from Figure 3, this plate has ribs 12b which provide guideways for slidable latch bolts 13. The latter are adapted to enter the slots 11, being pressed toward the slots by means of a spring 14, which surrounds the reduced portions of the bolts 13. The latter are provided with slots 13a arranged to receive lugs 15, which are integral with the pressure plate 12, so as to limit the movement of the latch bolts, as shown in Figure 3. Stop members 12c limit the movement in the opposite direction. A cap plate 16 is provided for holding the latch bolts 13 in position, this cap plate being held to the ribs 12b by means of screws 16a.

A presser plate 17 is disposed in the container and a spiral spring 18 bears at one end on the presser plate 17 and at the opposite end on the pressure plate 12.

From the foregoing description of the various parts of the device, the operation thereof may be readily understood. The plate 10 is fitted in position by placing the tongue 10b in the opening 8a and the portions 10a and the slots or recesses 6b and 7b respectively. The compression spring 18 is inserted between the plates 17 and 12. The ham, with the bones first removed, is placed in the container between the plates 17 and 10 and the cover portion 9 is then placed on the container, thus locking the plate 10 in position. The container with the ham therein is now placed in the position shown in Figure 1 and pressure is exerted on the pressure plate, thus tending to compress the spring 18. As the pressure plate 12 moves downwardly as in Figure 1, the latch plates, owing to their bevelled edges, will be forced inwardly until they reach the next succeeding slot, when they will spring outwardly again to prevent retractive movement of the plate. The pressure is continued until the ham has reached the desired compression. When this point has been reached, the container is then ready for a suitable cooking vessel or vat containing water, and the heat is applied in the usual manner. During the cooking of the ham, the spring 18 causes the plate 17 to press continuously on the ham, and the ham is cooked in its own juices out of contact with the water.

When the ham has been cooked, the container is removed from the boiling vat. The cover 9 is slid off, thus freeing the plate 10, which may be removed, and the ham taken from the container. The pressure plate 12 may now be pushed until the latch bolts have cleared the slots 11 when the pressure plate may be removed and replaced in its original position, after washing and drying.

It will be seen that the walls of the container are smooth, that is to say, there are no inwardly projecting members as in my prior patent nor outwardly projecting members on the exterior thereof. Therefore, there is no chance for such parts to cut the hands of the user and no chance for the lodgment of grease.

I claim:

1. A ham press comprising a rear wall, side walls, said walls being smooth and unobstructed on the interior thereof, said side walls having a series of slots near one end and being provided with outwardly projecting flanges on the edges thereof and having recesses on the interior extending into said flanges near the opposite end of the container, the rear wall having an opening in the same plane with the recesses, an end plate having extensions arranged to enter said recesses and a tongue arranged to enter the opening in the rear wall, a cover plate having recesses arranged to receive the flanges on the side walls, a pressure plate, a pair of spring-pressed latch bolts carried by said pressure plate and arranged to enter the slots in the side walls, a presser plate, and a spring disposed between the pressure plate and the presser plate.

2. In a ham press, a rear wall provided with an opening, integral side walls, said side walls having outwardly extended V-shaped flanges on their edges and being provided on the interior with recesses extending into said flanges and registering with the opening in the rear wall, an end plate having a tongue arranged to enter the opening in the rear wall and having extended portions arranged to enter the recesses in the side walls, and a cover plate having V-shaped recesses or grooves arranged to receive the V-shaped flanges and adapted for sliding engagement with the latter whereby the end plate is securely locked in position.

CLARENCE BUTZ.